Figure 5:
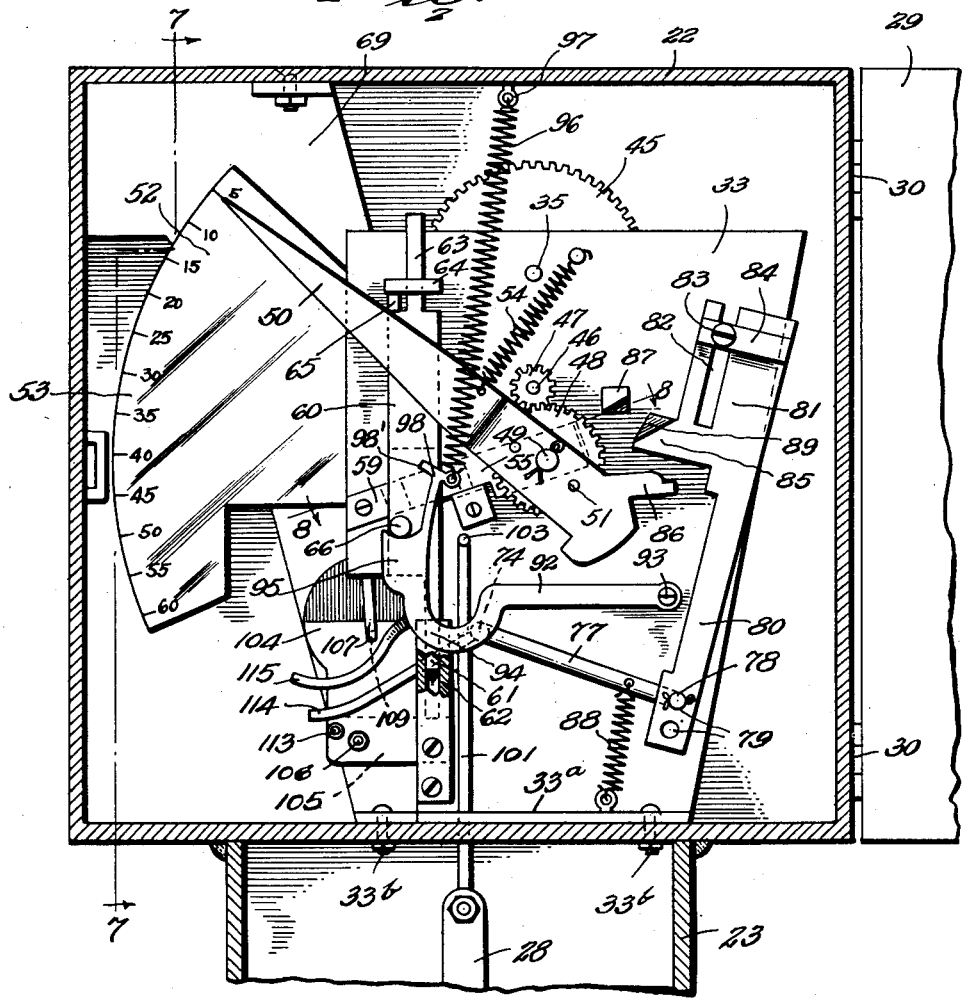

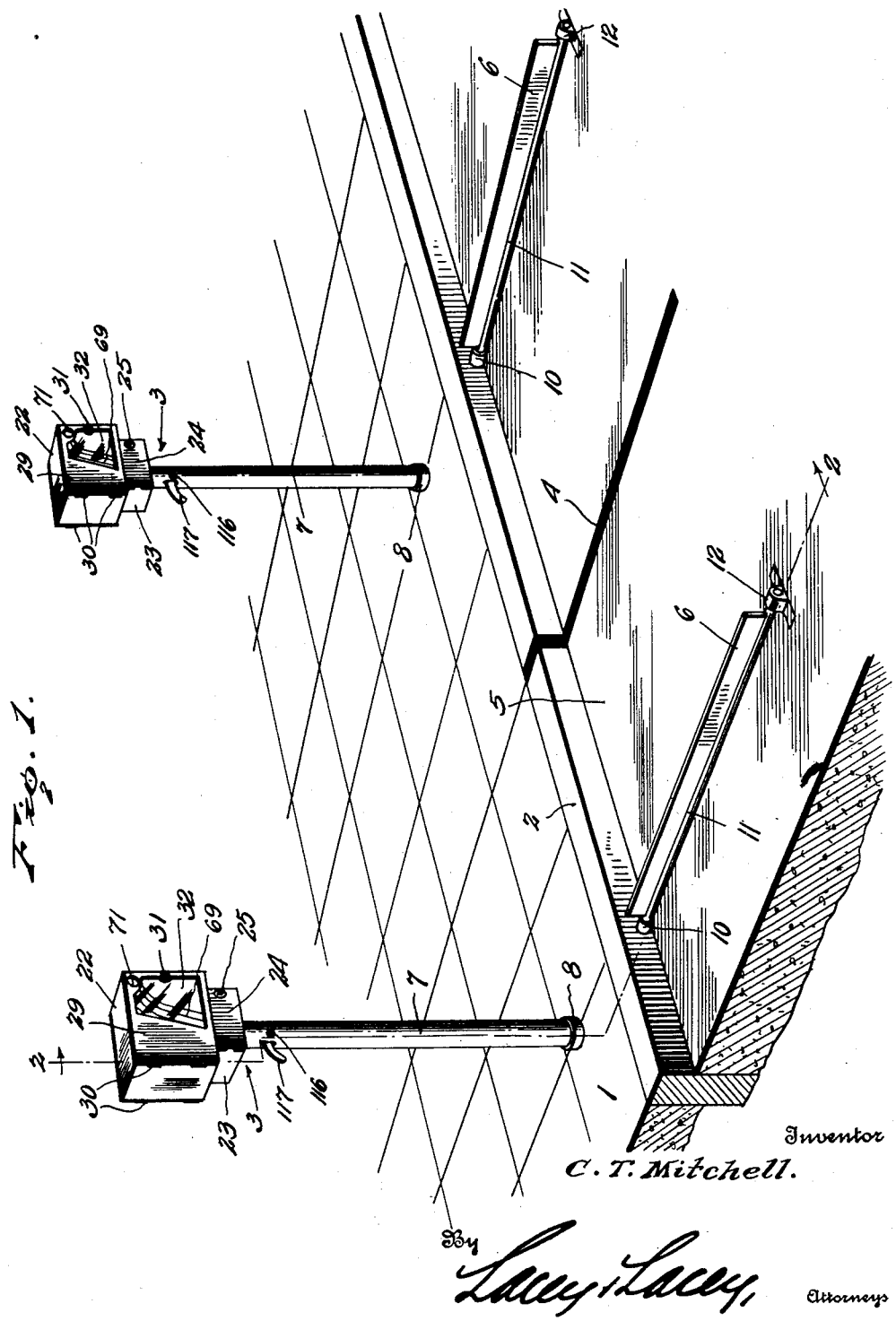

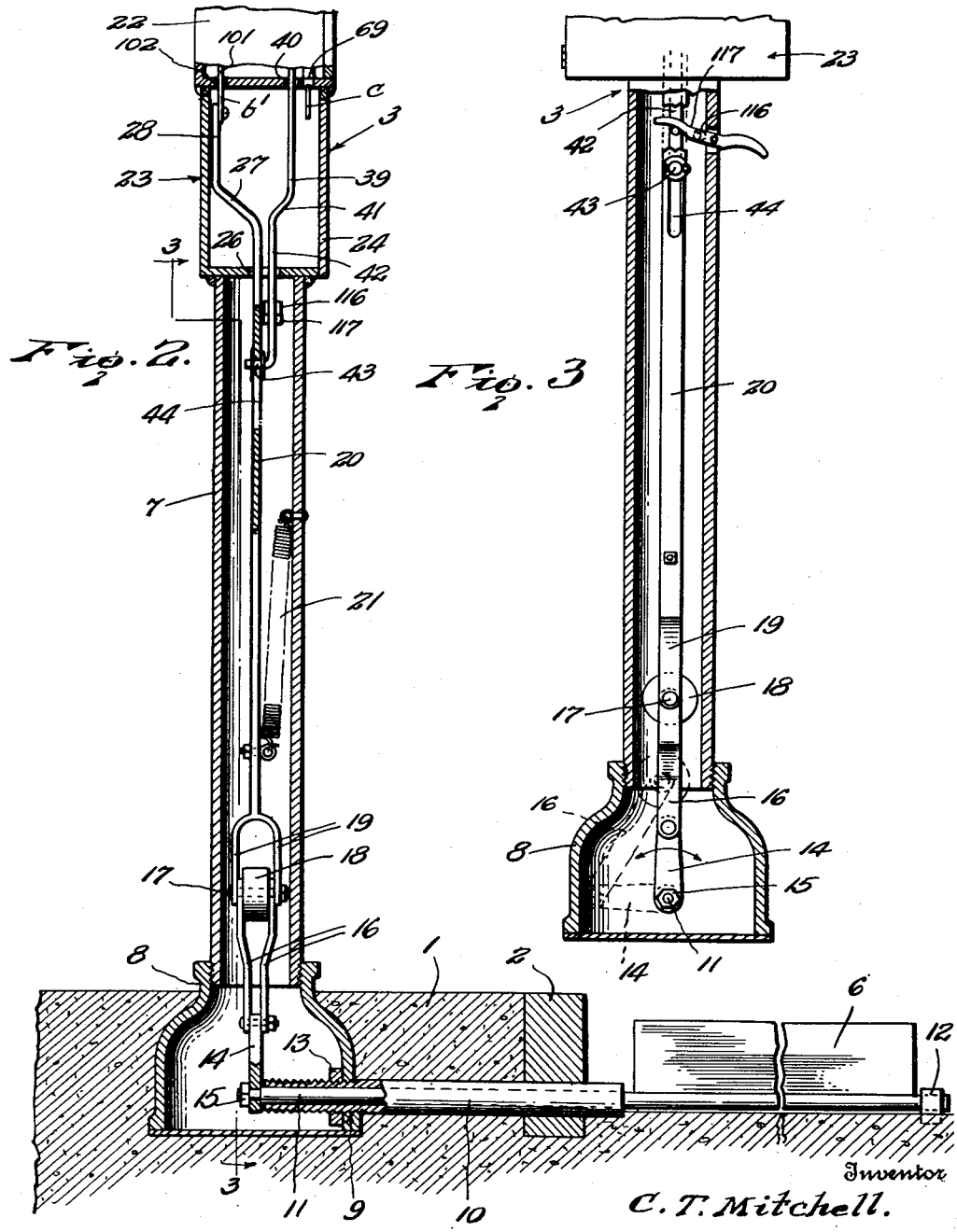

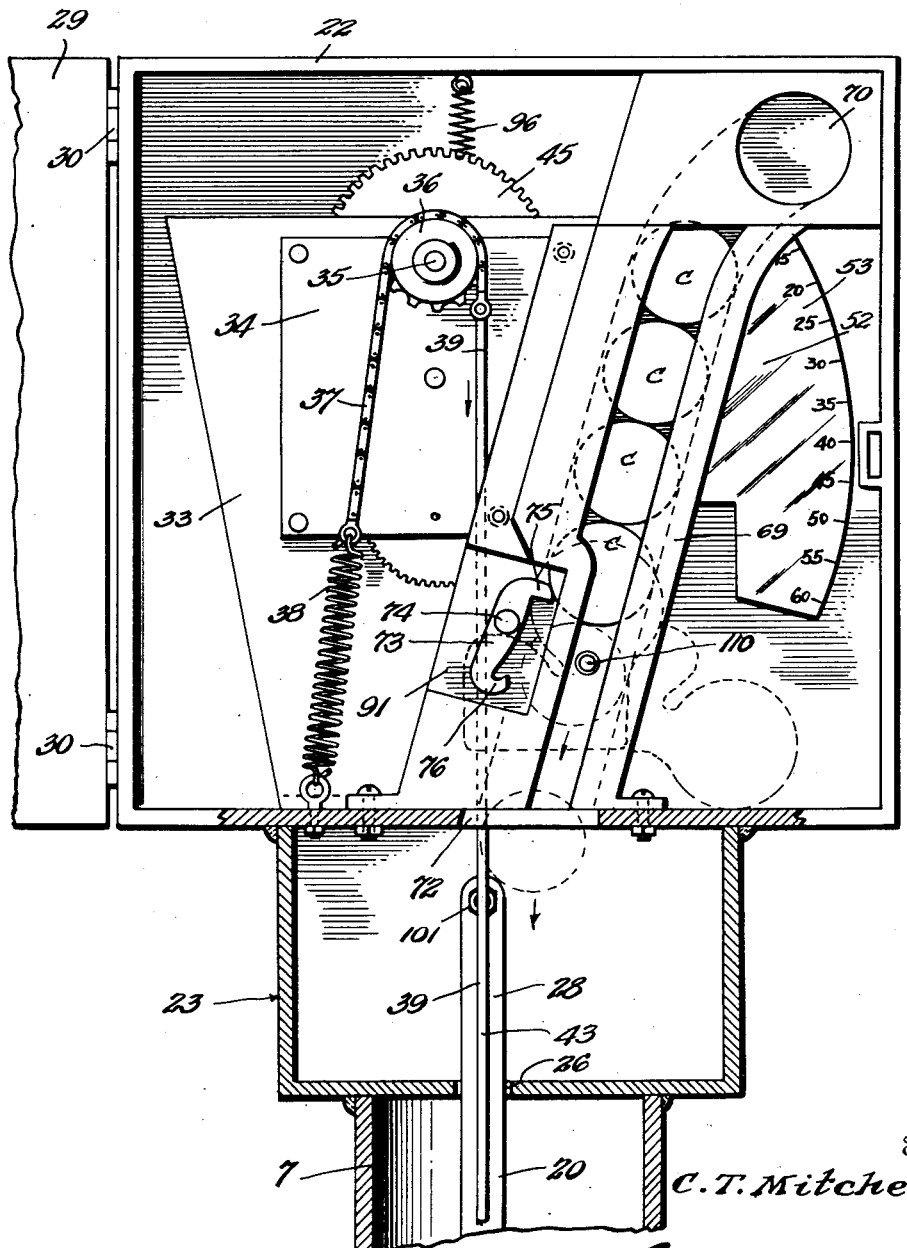

Jan. 21, 1941.  C. T. MITCHELL  2,229,183
PARKING METER
Filed Jan. 18, 1937  5 Sheets-Sheet 4

Inventor
C. T. Mitchell.
By Lacey & Lacey,
Attorneys

Jan. 21, 1941.  C. T. MITCHELL  2,229,183
PARKING METER
Filed Jan. 18, 1937  5 Sheets-Sheet 5
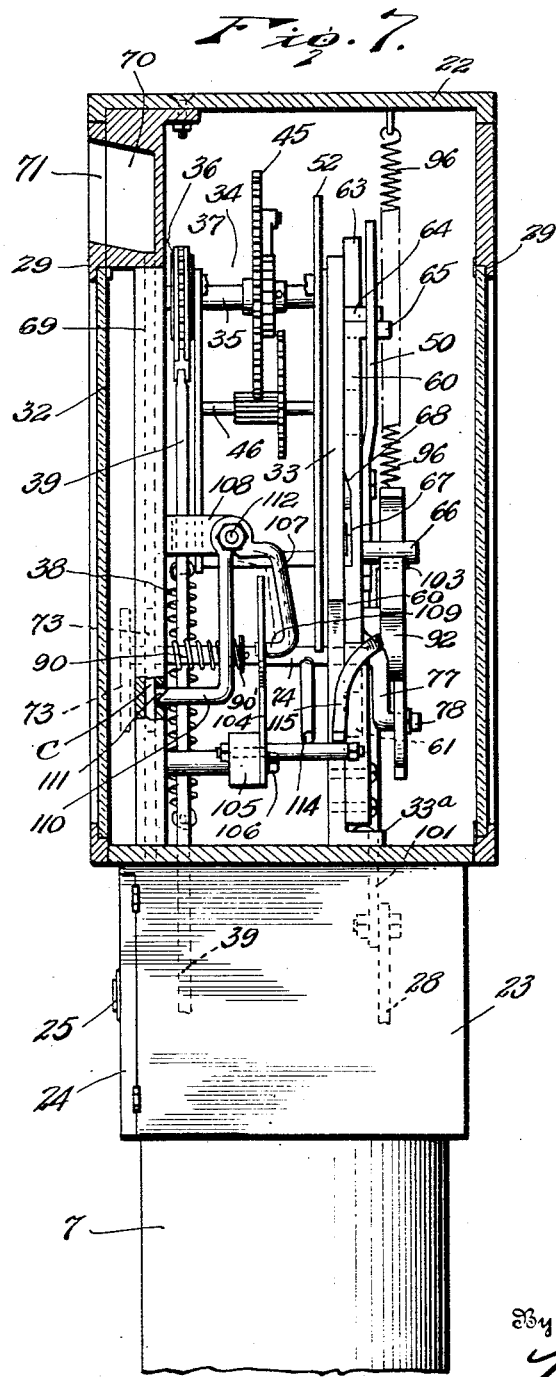
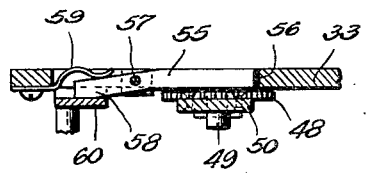
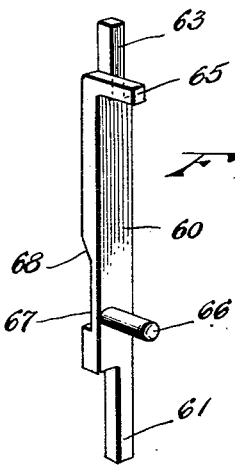
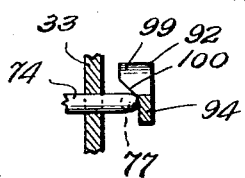
Inventor
C. T. Mitchell.
By Lacey & Lacey,
Attorneys Patented Jan. 21, 1941

2,229,183

UNITED STATES PATENT OFFICE 2,229,183

PARKING METER

Cecil T. Mitchell, Dallas, Tex., assignor of twenty-five per cent to Burwell W. Jones, Wichita Falls, Tex.

Application January 18, 1937, Serial No. 121,219

14 Claims. (Cl. 194—20)

This invention relates to a parking meter and one object of the invention is to provide a meter which may be erected upon a sidewalk adjacent a curb and includes a cooperating treadle mounted in the street so that, when an automobile is driven up to the curb and parked, the wheels of the automobile will pass over the treadle and render the meter operative. It will thus be seen that each time a car is parked a spring connected with the treadle and serving as a driving force for the meter will be tensioned and operation of the meter assured.

It is another object of the invention to so arrange the treadle and the connecting means between the treadle and the spring that the treadle may be actuated by the wheels of the automobile passing over the treadle when the automobile is moving either forwardly or rearwardly.

It is another object of the invention to provide a parking meter which is coin controlled and so constructed that either one or a number of coins may be inserted according to the length of time the driver of the automobile estimates that the car will be parked at the curb.

It is another object of the invention to provide improved means for controlling feeding of coins through a coin chute and successively moving coins into position to effect movement of a signal flag into a concealed position which indicates that the driver of the automobile has paid the parking charge.

It is another object of the invention to so construct the coin-feeding mechanism that, if the driver of the automobile leaves the curb before expiration of the time for which he has paid, all coins in the coin chute will be released and dropped into a coin box. It will thus be seen that, when one automobile is driven away from the curb and another takes its place, the meter will have been returned to neutral and the driver of the second automobile will not obtain free parking for the unexpired length of time paid for by the previous occupant of the parking space.

Another object of the invention is to so construct this meter that, when it is in operation, an indicator hand moves along a dial and thus indicates the length of time the car has been parked.

It is another object of the invention to provide means whereby, upon releasing a normally locked lever, the meter may be tested without its being necessary to drive an automobile over the treadle located in the street. It will also be apparent that in case the street should be covered with snow or ice which might interfere with movement of the treadle a traffic officer or other authorized attendant may set the meter in operation after the driver of the automobile has parked his car and deposited coins in the coin chute.

Another object of the invention is to provide a meter wherein the spring-driven train of gearing and other mechanism is enclosed in a housing which will protect the mechanism from being tampered with or damaged by dust or rain or snow, portions of the walls of the casing being glass in order that the coin chute will be exposed to view so that a traffic officer can see whether the proper coin has been placed in the chute.

The invention is illustrated in the accompanying drawings, wherein

Figure 1 is a perspective view showing parking meters of the improved construction erected adjacent a curb and their companion treadles extending transversely of the curb, Figure 2 is a sectional view taken vertically through the meter and longitudinally of its treadle along the line 2—2 of Figure 1, Figure 3 is a sectional view taken vertically through the base and standard of the meter at right angles to Figure 2, the view being along the line 3—3 of Figure 2, Figure 4 is a view of the upper portion of the meter with the door of the casing open and mechanism within the casing shown in elevation, the coin box and the upper portion of the standard being shown in section.

Figure 6:
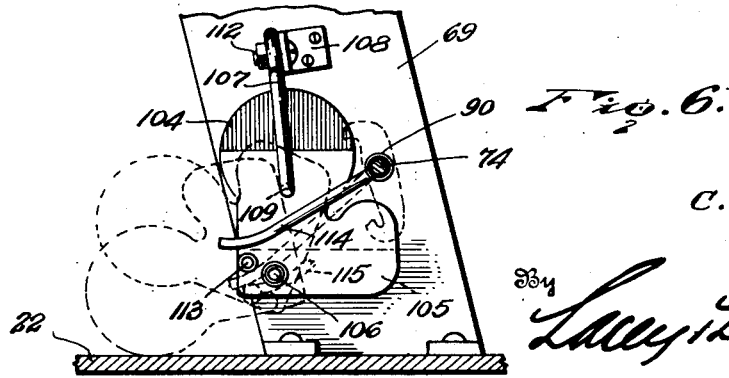

Figure 5 is a view looking at the mechanism within the casing from the other side of Figure 4, the casing and the coin box being shown in section, Figure 6 is an enlarged fragmentary view showing the flap and the actuating means therefor, Figure 7 is a sectional view taken transversely through the meter along the line 7—7 of Figure 5, Figure 8 is a fragmentary sectional view taken along the line 8—8 of Figure 5, Figure 9 is a perspective view of a slidably mounted bar forming part of the mechanism, and Figure 10 is a fragmentary view of the coin-releasing mechanism and illustrating the manner in which the coin-releasing mechanism is moved into position to release all coins in the coin chute.

The improved parking meter is to be erected upon the sidewalk 1 inwardly from the curb 2 a short distance which may be fourteen inches from the curb or any other distance desired.

The meters, which are indicated in general by the numeral 3, are spaced from each other longitudinally of the sidewalk at such a distance that, when dividing lines 4 are painted or otherwise marked upon the curb and the adjacent portion of the pavement 5, a parking meter will be provided for each parking space defined by the lines 4, and treadles 6 which cooperate with the meters will be disposed transversely of the curb in the parking spaces. It will thus be seen that the meters are individually operated and the treadles may be actuated by automobiles driving forwardly into the parking spaces or backing into the same until the front or rear wheels pass over the treadles. In view of the fact that the treadles will be located between the front and rear wheels of an automobile which has been parked, either the front or the rear wheels must pass over the treadle when an automobile is driven out of a parking space and the treadle will be again actuated to effect release of any coin remaining in the coin-receiving chute of the meter, as will be hereinafter more fully explained. This will prevent a person who drives into a parking space which has just been vacated from obtaining free parking at the expense of the driver who has just vacated the parking space.

The meter has a standard 7 formed of strong pipe or metal tubing which has its lower end screwed into a base 8 which is hollow and preferably formed as a casting. This base is embedded in the sidewalk, as shown in Figure 2, and at one side the base is formed with a threaded opening 9 into which is screwed the inner end portion of a tube 10 which constitutes a bearing for the shank or shaft 11 of the treadle 6, the outer end of the shaft being rotatably received in a bearing 12 fixed to the pavement in any desired manner. A securing nut 13 is screwed upon the inner end portion of the tube or sleeve 10 within the hollow base and, when tightened, firmly holds the tube in place. An arm 14 is secured in a fixed position upon the inner end of the shaft 11 by a nut 15 and this arm extends radially of the shaft and normally extends upwardly in the vertical position shown in Figure 3. Referring to this figure, it will be seen that the arm is of such length that it may be swung downwardly either toward the right or left when an automobile wheel passes over the treadle. It will thus be seen that the arm may be swung downwardly by the automobile passing either forwardly or rearwardly over the treadle. Links 16 are pivoted to the upper end of the arm 14 and at their upper ends are loosely engaged with a bolt or pin 17 at opposite sides of a roller 18, and upon referring to Figure 2, it will be seen that the bolt also passes through lower ends of the forks 19 provided at the lower end of a bar 20 which extends vertically in the standard and is yieldably held against downward movement by a spring 21. The roller 18 guides vertical movement of the bar in the standard and since it will have rolling contact with walls of the standard the bar may be easily drawn downwardly and quickly returned to its normal position as the wheels of an automobile pass over the treadle.

The box or casing 22 of the meter is of rectangular shape and rests upon a coin box 23 which is firmly mounted at the upper end of the standard 7 and provided with a door 24, as shown in Figures 1 and 7, and provided with a lock 25 so that it may be secured when closed and only opened by an authorized person. The upper end portion of the bar 20 extends into the coin box through an opening 26 in the bottom thereof and in vertically spaced relation to the bottom of the coin box is bent diagonally towards one side, as shown at 27, so that the upper end 28 of the bar is disposed against a wall of the coin box. Side walls of the meter box or casing are also in the form of doors 29 which are hinged, as shown at 30, and provided with locks 31 in order that they may be securely held closed so that unauthorized persons cannot open the doors and tamper with the mechanism housed in the meter box or casing. Portions of the doors are cut out to provide openings in which panes of glass 32 are mounted in order that the interior of the box or casing may be seen and time-indicating mechanism and a coin chute exposed to view. It will thus be seen that it can be accurately determined how long a car has been parked illegally in case the driver of an automobile fails to insert coins in the coin chute and also the coin chute may be seen, as shown in Figure 1, and a traffic officer or other attendant see whether the correct coin has been placed in the coin chute.

Within the meter box or casing, there has been mounted a supporting plate 33 which extends vertically and has its lower portion bent to provide a base flange 33ª through which bolts or other suitable fasteners 33ᵇ are passed to firmly secure the flange upon the bottom of the casing and mount the plate in its upright position. Clockworks which are indicated in general by the numeral 34 are secured against one side face of the supporting plate but are not specifically described in detail as they are of a conventional construction except that the main spring is omitted. The shaft 35 of the clockworks or train of gearing carries a sprocket wheel 36 at one end, and about this sprocket wheel is trained a sprocket chain 37 having one end connected with a strong barrel spring 38 and its other end connected with the upper end of a pull rod 39 which extends downwardly through an opening 40 formed in the bottom of the meter box or casing and through the coin box with its lower portion bent towards the bar 20, as shown at 41 in Figure 2, and then again downwardly in parallel relation to the bar 20. This lower portion 42 of the rod 39 passes through the opening 26 and at its lower end is bent to form a side extension or finger 43 which passes through a slot 44 formed longitudinally of the bar 20. Referring to Figure 2, it will be seen that, when the bar 20 is drawn downwardly by pull exerted when the shaft 11 is turned due to wheels of an automobile passing over the treadle 6, pull will be exerted upon the rod 39 due to the fact that the finger 43 passes through the slot 44 at the upper end thereof and that after the wheel of an automobile has moved off the treadle and the spring 21 contracts the bar 20 may be shifted upwardly to its initial position without carrying the rod 39 with it. Downward pull upon the rod 39 expands the spring 38 to place it under tension and as this spring 38 contracts to draw the rod 39 upwardly and restore its side extension or finger to the upper end of the slot 44 rotary motion will be imparted to the shaft 35 and the main gear 45 of the clockworks will be turned with the shaft. Motion will thus be imparted to the gearing in the same manner in which a clockwork is driven when the main spring is wound. There will be no danger of overwinding as the spring 38 is expanded when the rod 39 is drawn downwardly and downward movement of the rod is brought to a stop as soon as the treadle has been swung downwardly into flat contacting engagement with the surface of the pavement. It will, of course, be understood that the shaft 35 is always free to be turned when the rod 39 is drawn downwardly but carries the ratchet gear 45 with it when it is turned by pull of the expanded spring 38. Rotary motion is imparted to the shaft 46 of the clockworks when the shaft 35 and the ratchet gear 45 are turned by pull of the spring 38 and this shaft carries at one end a small gear or pinion 47 which is in mesh with a larger gear 48 carried by a shaft 49 to which a hand or pointer 50 is firmly secured by rivets 51 which pass through the hand and through the gear. It will thus be seen that, when the shaft 46 is turned and rotary motion imparted to the gear 48, the hand will be swung downwardly from a position adjacent the upper end of a dial 52 to the lower end thereof to indicate the time a vehicle has been parked. This dial consists of a metal plate secured to and projecting from one side edge of the mounting plate 33 and having its outer or free side edge arcuate and provided with scale markings, as shown at 53. The hand is yieldably held against downward movement from the neutral position shown in Figure 5 by a spring 54 which serves to return the hand to the neutral position after the hand has traveled to the lower end of the scale 53 which represents sixty minutes' parking time, and in order to permit the hand to be quickly returned to the raised or neutral position, the shaft 49 which carries the gear 48 and the hand has been mounted, as shown in Figure 8. Referring to this figure, it will be seen that the shaft 49 is carried by a rocker bar 55 which is pivotally mounted in a slot or opening 56 formed in the plate 33 by means of a pivot pin 57. The portion of the rocker bar through which the pivot pin 57 passes, extends at an angle to the portion carrying the shaft 49 and, therefore, this end portion 58 of the rocker bar forms an arm or handle which is engaged by a spring 59 and normally projected outwardly from the slot or opening 56. A slide bar or plunger 60 is disposed vertically against the mounting plate 33 in crossed relation to the handle 58 of the rocker bar and is provided at its lower end with a stem 61 slidably received in a vertically disposed socket 62 while at its upper end the bar or plunger is formed with a stem 63 slidably engaged through a mounting or bearing 64. Upper and lower side arms or pins 65 and 66 project outwardly from the bar or plunger 60 to serve as abutments and back of the lower pin or arm 66 the bar is formed with a recess 67 having a beveled upper end portion providing a cam surface 68. The hand or pointer 50 operates between the side arms 65 and 66 and when the pointer is swung downwardly and approaches the limit of its downward movement it will engage the arm 66 and force the bar or plunger 60 downwardly so that the cam surface 68 will be moved into engagement with the handle 58 which extends through the recess 67 and applies pressure to this handle to swing the rocker bar outwardly and thus move the large gear 48 out of mesh with the small gear or pinion 47. The gear 48 will thus be released from the gear 47 and the spring 54 can contract and quickly return the hand to the elevated or neutral position. As the hand moves upwardly, it makes contact with the upper side arm 65 and the plunger or bar 60 will be returned to the elevated position so that the spring 59 may restore the rocker bar to the position shown in Figure 8 and again place the gear 48 in mesh with the gear 47.

A coin chute 69 extends vertically in the casing 22 at an incline, as shown in Figures 4 and 5, and has its upper end formed with an entrance 70 which registers with a coin-receiving opening 71 formed in the door 29 facing the street. This coin chute is of sufficient length to receive a number of coins which may be five or any other predetermined number and the lower end of the coin chute registers with an opening 72 through which the coins pass into the cash box 23. The coins are to be released for passage from the coin chute into the coin box one at a time, and in order to temporarily retain the coins in the coin chute and successively release the same, there has been provided a keeper 73 which has a formation similar to that of an escapement and consists of a flat plate fixed to one end of a rocker shaft 74 and provided with upper and lower fingers 75 and 76 spaced from each other a sufficient distance to permit a coin to be disposed between the two fingers. When a coin is so disposed, it rests against the lower finger and the coin directly above it rests upon the upper finger. When, however, the escapement is moved to the position shown in Figure 4, the lower coin will be released for passage into the coin box and upon return of the keeper to its initial position the upper finger will move out of engagement with the coin against which it bears and the coins will drop down through the chute until the lower coin moves into engagement with and is supported by the lower finger. It will thus be seen that the coins will be successively fed through the coin chute. The rocker shaft 74 is rotatably supported by the coin chute and by the main plate 33 with one end portion projecting outwardly from the main plate and bent to provide a crank arm 77 terminating in a transversely extending finger 78 which is passed through a selected one of the openings 79 formed near the lower end of a slide bar 80 which extends vertically at an incline, as shown in Figure 5, and has its upper end widened to form a head 81. A slot 82 extends longitudinally of the head 81 from the upper end thereof and through this slot extends a pin or screw 83 carrying a cross strip 84 which extends for substantially the full width of the head and slidably holds the bar 80 against the plate 33. A side arm 85 is formed at the lower end of the head 81 under the slot 82 for engagement by the side arm 86 at the rear or inner end of the hand or pointer 50, and from an inspection of Figure 5 it will be readily seen that as the hand swings downwardly the arm 86 will move upwardly to engage the lower edge face of the side arm 85 and shift the bar 80 upwardly until the side arm 86 engages and moves across the sloping surface of the cam block 87 carried by the plate 33. This will cause the rocker bar 55 to be swung about its pivot 57 and shift the gear 48 and the hand forwardly to move the arm 86 out of engagement with the side arm 85 of the slide bar and the spring 88 can contract and exert pull upon the crank arm 77 to restore the rocker shaft 74 to its initial position and draw the slide bar 80 downwardly to the initial position shown in Figure 5. The slide bar is quickly drawn downwardly and the hand or pointer is also quickly drawn upwardly to its initial or neutral position by the spring 54, and in order to prevent the arm 86 from catching against the upper edge face of the side arm 85, a cam surface 89 has been provided. It will thus be seen that the coins will be intermittently fed one at a time from the coin chute into the coin box and that releasing of the coins will take place in proper timed relation to movement of the hand 50 as actuation of the rocker shaft is effected by movement of the slide bar 80 which in its turn is operated by the arm 86 of the hand.

A spring 90 is coiled about the rocker shaft between the coin chute and an abutment 90' carried by the rocker shaft and yieldably resists longitudinal shifting of the rocker shaft. Therefore, the keeper 73 will be normally retained in the recess or pocket 91 formed in the coin chute, as shown in Figure 4, but the rocker shaft may be shifted longitudinally to move the keeper out of the pocket to the position indicated by dotted lines in Figure 7 and thus permit all of the coins in the coin chute to pass into the coin box. This operation of clearing the coin chute of all coins therein is to take place when the treadle 11 is depressed by the wheels of an automobile as the operator of the automobile drives the same away from the parking space. It will also take place when the treadle is depressed as a car is driven up to the curb in case the wheels of an automobile should not pass over a treadle as an automobile is driven away from the curb.

Sliding movement of the rocker shaft in a direction to move the keeper out of the recess or pocket is accomplished by means of a lever 92 which has one end pivoted to the plate 33 by a pivot pin or bolt 93. The other end portion of the lever is bent downwardly and then upwardly to form a bill 94, the outer arm of which is widened to form a side extension or shoulder 95. The upper end of this side extension or shoulder is engaged by the pin 66 of the slidably mounted bar or strip 60, and in order to maintain the shoulder in engagement with the pin, there has been provided a spring 96. The upper end of the spring 96 is connected with a supporting eye bolt 97 carried by the top wall of the casing 22 and the lower end of this spring is connected with the cross head 98 at the upper end of the bill 94. At the junction of the lever 92 with its bill 94, there has been provided an inwardly thickened portion 99 which defines a cam surface 100 adapted to engage the end of the rocker shaft 74 at its junction with its crank arm 77 and exert longitudinal thrust upon the rocker shaft as the lever is moved downwardly. A rod 101 is bolted at its lower end to the upper end of the extremity 28 of the pull bar 20 and extends upwardly into the casing 22 through the opening 102 formed in the bottom thereof. This rod 101 extends upwardly in the casing between the plate 33 and the U-shaped bill 94 of the lever and has its upper end bent to form a side arm or hook 103 which overhangs the bill and is adapted to engage the bill and swing the lever downwardly during depression of the treadle. It will thus be seen that downward movement will be imparted to the lever during depression of the treadle by passage of wheels of an automobile over the same in either direction, and, therefore, when an automobile is driven away from a parking space or into the parking space, the lever will be swung downwardly and longitudinal thrust imparted to the rocker shaft to move the keeper 73 out of its seat and allow all coins in the coin chute to drop into the coin box. In view of the fact that all coins remaining in the coin chute will be released as an automobile is driven away from the parking space or into the same, the driver of another automobile which is driven into the parking space cannot obtain the benefit of unused time which has been paid for by a departing driver.

It is desired to indicate whether or not coins have been placed in the coin chute by the driver of a parked automobile, and in order to do so, there has been provided a visible signal 104 which may be referred to as a flag. This flag or signal may be formed of Celluloid or any other desired material and it is partially painted red or any other color which will make it easy to see when in a lowered position. This flag or signal is secured to a weight 105 which is pivotally mounted adjacent one end by a pivot pin 106 extending from the lower end portion of the coin chute. In view of the fact that the pivot pin passes through the weight adjacent one end thereof, the flag or signal will tend to return to the raised position after being swung downwardly and, when it is in this position, it will be disposed between the coin chute and the plate 33 and hidden from view. In this position it indicates that the proper coin or coins have been placed in the coin chute, but when it is in the lowered position where it may be seen, it constitutes a visible signal indicating to a traffic officer or other attendant that the meter is operating without the proper coin having been inserted.

A latch 107 is pivoted at its upper end to a bracket 108 carried by the coin chute, and this latch has depending arms between which the signal operates. One arm is formed at its lower end with a laterally extending finger 109 adapted to engage back of the signal after the signal has been swung downwardly and thus prevent the weight from returning the signal to the elevated or concealed position and the other arm of the latch has its lower portion bent to form a finger 110 which passes through an opening 111 formed in the coin chute and has a beveled end face. The latch normally remains in the position indicated by dotted lines in Figure 7 with the beveled end of the finger 110 projecting into the coin chute and the finger 109 positioned to engage back of the signal and prevent the signal or flag from returning to the hidden position. When, however, a coin is inserted and drops downwardly through the coin chute into position to engage the beveled end of the finger 110, the pressure will be applied to the finger and the latch will be tilted about its pivot 112 to a position in which the weight 105 can swing the signal upwardly to an elevated position in which it is concealed back of the coin chute.

The signal is to be swung downwardly into a visible position each time the lever 92 is swung downwardly by the wheels of an automobile passing over the treadle and it is also to be swung downwardly to a visible position each time the rocker shaft is turned by upward movement of the slide bar 80. In order to impart downward movement to the signal flag, there has been provided a side pin 113 which projects laterally from one side of the flag and arms 114 and 115 carried by and extending laterally from the rocker shaft 74 and the bill 94 of the lever 92. Referring to Figures 5, 6 and 7, it will be readily seen that, when the lever 92 is swung downwardly by the hook 103 of the rod 101, the arm 115 will engage the pin 113 and swing the signal flag downwardly to the lowered position indicated by dotted lines in Figure 6. The latch will then move to the position indicated by dotted lines in Figure 7 in case there are no coins in the coin chute and the finger 109 of the latch will engage back of the flag and prevent it from completely returning to a raised or concealed position. Therefore, the flag will be visible and show that no coins have been placed in the coin chute.

If a coin is placed in the coin chute, it will move down the chute into position in which it is supported between fingers of the escapement and will apply pressure to the beveled end of the latch arm 110 and move the latch into position to permit upward movement of the signal flag. Since downward movement of the treadle has effected tensioning of the spring 38, the clockworks will be set in motion and the hand or pointer 50 will move downwardly along the dial 52 with its free end in cooperating relation to the scale markings 53 of the dial. As the hand approaches the extent of its downward movement, it engages the pin 66 and swings the lever 92 downwardly a short distance but not sufficient to move the escapement or keeper 73 out of the coin chute. The upper end of the arm 86 of the hand engages the side extension or shoulder 85 of the slide bar 80 and shifts the bar upwardly so that rotary motion will be imparted to the rocker shaft and the keeper will be rocked about its pivot to release the coin at the bottom of the coin chute and at the same time the arm 114 engages the pin 113 to swing the signal downwardly to a lowered position. As the pointer reaches the limit of its downward movement, the gear 48 is shifted out of engagement with the gear 47 and is drawn upwardly to the elevated or neutral position by the spring 54. Just prior to upward movement of the pointer, the arm 86 moves out of engagement with the side extension 89 of the slide bar and the spring 88 contracts and draws the slide bar downwardly. At the same time the rocker shaft is turned in a direction to dispose the lower finger 76 of the keeper in position to engage a coin and support the coin in contact with the outer end of the finger 110 of the latch. It will thus be seen that, if more than one coin has been placed in the coin chute, the latch will be moved into position to permit upward movement of the signal whereas, if no more coins are in the chute, the latch will remain in position to prevent upward movement of the signal to a concealed position. In view of the fact that depression of the treadle expands the spring 38 sufficiently to operate the hand a number of times corresponding to the number of coins the chute will hold, continued operation of the meter with the signal in the lowered or visible position will show that either the driver of the automobile did not place a coin in the chute or has been parked in the parking space a length of time greater than that permitted by one coin.

When the automobile is driven away from the parking space and the wheels pass over the treadle, downward pull will be exerted upon the bar 20, to the upper end of which the rod 101 is secured and the lever 92 will be swung downwardly a sufficient distance to shift the rocker shaft longitudinally a sufficient distance to move the keeper out of the recess 91 and thus release all coins remaining in the coin chute. During this downward movement of the lever, the arm 115 will engage the pin 113 to swing the signal downwardly to a lowered position. The hand will return to the neutral position as during the time the lever is swung downwardly by the hook 103 the end portion 98' of the cross head 98 will engage the side arm or pin 66 of the bar 60 and the rocker bar 55 will be tilted about its pivot to move the gear 48 out of engagement with the gear 47. Although the meter may continue to operate without a car occupying the parking space, the spring 38 will be completely tensioned each time an automobile drives into the parking space and the hand returned to its raised or neutral position. The fact that the spring 21 is a very strong spring and can only be expanded when a vehicle of sufficient weight passes over the treadle will prevent the treadle from being depressed by a person stepping upon it. In case snow or ice should form in the street to such an extent that depression of the treadle to its usual lowered position is prevented, this will not cause trouble for the driver of the automobile as he can still park his car and place coins in the coin chute. A traffic officer who sees an automobile parked and the meter not in operation will then insert a key in the lock 116 to release the lever 117 and by grasping the outer end of this lever exert upward force. This lever has forks at its inner end which straddle the lower portion 42 of the rod 39 and the rod will be shifted downwardly with the side pin 43 at its lower end moving through the slot 44. It will thus be seen that pull may be manually applied to shift the rod 39 downwardly and exert pull upon the sprocket chain 37 to turn the main shaft 35 and expand the spring 38. This spring has sufficient strength to operate the clockworks but it is not of such strength that it cannot be expanded when the lock 116 is released and the lever 117 manually operated.

When this parking meter is in use, it is installed as shown in Figures 1 and 2 with the post 7 rising from the sidewalk inwardly of the curb and the shaft 11 carrying the treadle 6 projecting laterally from the curb with the treadle projecting upwardly in position for the wheel of an automobile or other vehicle to pass over it as the vehicle is parked or driven away from the curb. When a vehicle is driven into the parking space or backed into the parking space, a wheel passes over the treadle and depresses it to turn the shaft 11 and swing the arm 14 downwardly so that it exerts pull upon the bar 20. As the bar 20 is drawn downwardly, it exerts pull upon the sprocket chain 37 to expand the spring 38 and as the wheel of the vehicle moves off the depressed treadle, the spring will tend to contract. Contraction of the spring rotates the shaft 35 and the ratchet wheel 45, thus imparting motion to the train of gearing 34 and causing the shaft 46 to be turned. Rotary motion is transmitted from the shaft 46 to the gear 48 carried by the rocker bar 55 and as the gear 48 turns the pointer 50 will be gradually swung downwardly along the dial 52. It takes an hour for the pointer to reach the lower end of the dial but one downward swinging movement of the pointer does not exhaust the pulling capacity of the spring 38 as this spring is of such dimensions that, in the present illustration, the spring will not be fully contracted and lose its pulling power until the pointer has completed at least five downward swinging movements and returned to its raised position. During downward movement of the pointer 50, the arm 86 moves upwardly and engages the head 85 of the slide bar 80 to shift this bar upwardly for a purpose to be hereinafter set out, and as the pointer approaches the lower end of the dial, the pointer engages the pin 66 and shifts the strip 60 downwardly to a position in which its cam 68 acts upon the handle 58 of the rocker bar 55 and causes the rocker bar to be tilted about its pivot 57 and move the gear 48 out of engagement with the pinion 47. The spring 54 then contracts and rapidly returns the pointer to its raised position. During this upward swinging movement of the pointer, the rocker bar will return to its normal position to again dispose the gear 48 in mesh with the pinion 47 and another downward swinging movement of the pointer will take place. It will thus be seen that the spring 38 will be tensioned its full capacity whenever a vehicle wheel passes over the treadle and repeated downward movements of the pointer and quick return to a raised position will continue until the spring 38 has fully contracted. This operation of the pointer is not dependent upon the insertion of a coin in the coin chute 69 but if coins are not placed in the chute this fact will be clearly indicated by a visible signal.

When the bar 20 is drawn downwardly to exert pull upon the rod 39 and tension the spring, the rod 39 is drawn downwardly with it, but since the bent end 43 of the rod 39 extends through a slot 44 in the bar 20, the bar 20 may be returned to its raised position by the spring 21 as soon as the vehicle wheel passes off the treadle 6 without carrying the rod 39 upwardly with it. Therefore, the rod 39 moves upwardly independent of the bar 20 under action of the spring 39 and if a parked vehicle leaves the curb before the spring 38 is fully contracted and another enters the parking space, passage of the vehicle wheel over the treadle will again draw the bar 20 downwardly and pull will be exerted upon the rod 39 to restore the spring to its fully extended condition. During downward movement of the bar 20 as a vehicle wheel passes over the treadle, the rod 101 is drawn downwardly and its bent end 103 engages the hooked end of the lever 92 to swing this lever downwardly and the finger 115 carried by the lever will engage the pin 113 to swing the signal or flag 104 downwardly to an exposed position and unless a coin has been placed in the coin chute the finger 109 of the latch 107 will move into position for engagement by the signal and prevent return movement of the signal to a concealed position. Therefore, a traffic officer will see the exposed signal and know that the meter is in operation without the proper coin having been deposited and by looking at the pointer and noting its position relative to the dial 50 will also know how long the vehicle has been illegally parked. If a coin is placed in the coin chute, it moves downwardly through the chute to a position in which it is supported upon the finger 76 of the keeper 73 and exerts pressure upon the finger 110 of the latch to swing the latch to the position shown in Figure 7 where it will be held and thus permit the signal to be returned to its raised and concealed position by means of the weight 105. During downward movement of the pointer 50, its arm 86 engages the head 85 of the slide bar 80 to move this bar upwardly and as the bar moves upwardly the shaft 74 carrying the keeper 73 will be turned to rock the keeper to the position of Figure 4 in which a coin will be released but other coins above the same held stationary by the finger 75 of the keeper. Rocking movement of the shaft 74 will also swing the arm 114 downwardly to depress the signal and when the arm 86 engages the cam lug 87 and is moved outwardly to release the head 85, the spring 88 will draw the slide bar and the arm 77 downwardly to turn the shaft 74 in a direction to swing the arm 114 upwardly to its initial position and restore the keeper to the position in which a coin may drop downwardly in the chute and rest upon the finger 76. If additional coins have been placed in the chute, the signal will be again permitted to return to its concealed position, but if only one coin has been placed in the chute, the signal will be held in its exposed position by the latch and indicate that the vehicle has been parked longer than the time allowed for a single coin. It will thus be seen that by placing a number of coins in the chute they will be successively allowed to move downwardly in the chute into position to rest upon the lower finger of the keeper and hold the latch in a position permitting the signal to return to its concealed position until the supply of coins is exhausted. Therefore, if a person expects to park the vehicle for a greater length of time than allowed for one coin, he may place a number of coins in the chute and they will successively move into position to permit return of the signal to its concealed position and it will not be necessary for the owner of the vehicle to make repeated trips to the meter in order to insert a coin at the expiration of each interval of time allowed by a single coin.

When the owner of the vehicle returns and drives the vehicle out of the parking space, a wheel will again pass over the treadle and exert downward pull upon the bar 20. As previously explained, this downward movement draws the rod 101 down to depress the lever 92 and as the curved end of the lever is formed with the cam 100 downward movement of the lever will exert thrust upon the shaft 74 longitudinally thereof and shift the keeper 73 out of the recess 91 in which it normally operates. Any coins remaining in the chute will thus be unsupported by the keeper and may drop downwardly into the cash box. It will thus be seen that the chute will be cleared of coins when a vehicle leaves the parking space. Even if the vehicle should pass out of the parking space without a wheel moving over the treadle, the next vehicle entering the parking space and depressing the treadle will cause the chute to be cleared of coins. The lever 92 is normally held in a raised position by the spring 96 and upward movement of the lever is limited by engagement of the shoulder 95 with the pin 66. While downward movement of the pointer brings it into engagement with the pin 66 to depress the bar 60 and effect rocking of the rocker bar 55 to tilt the rocker bar and move the gear 48 out of engagement with the pinion 47 to allow return of the pointer to the raised position, the downward movement exerted upon the pin by the pointer will not cause the lever 92 to be swung downwardly a sufficient distance to shift the shaft 74 longitudinally and clear the chute of coins. Therefore, when a number of coins have been placed in the chute, the pointer may be swung downwardly and then released for return to a raised position and the slide bar 80 moved to turn the shaft 74 and actuate the keeper to successively allow movement of the coins into position to hold the latch in such position that the signal may return to a concealed position. The only time that the lever 92 will be swung downwardly a sufficient distance to shift the shaft 74 longitudinally is when the bar 20 is drawn downwardly by depression of the treadle.

Having thus described the invention, what is claimed as new is:

1. In a parking meter, a casing, indicating means in said casing, operating means for said indicating means including a train of gearing and a spring for driving the gearing, means for tensioning said spring including an actuating member disposed in position adapting it to be operated by a vehicle, a signal movable from a hidden position to an exposed position, means for moving the signal to an exposed position when the spring is tensioned, a latch for maintaining the signal in an exposed position, and means for releasably holding a coin in position to act upon the latch and hold the latch in position permitting movement of the signal to a hidden position.

2. In a parking meter, a casing, indicating means in said casing, operating means for said indicating means including a power spring, means for tensioning said spring having operating means adapted to be moved to effect tensioning of the spring by engagement with a portion of a vehicle, a coin chute, a keeper for successively releasing coins in the chute, means for actuating said keeper operated in timed relation to said indicating means, and means for moving said keeper into position to release all coins in the chute when the spring-tensioning means is actuated by its operating means.

3. In a parking meter, a support, a casing carried by said support, indicating means in said casing, operating means for said indicating means including a power spring, a treadle, a shank for said treadle journaled in said support and extending laterally therefrom to dispose the treadle in a parking space in position to be actuated by passage of a vehicle over the treadle, means for tensioning said spring adapted to be actuated by rotation of said shank during depression of said treadle, a coin chute in said casing, an escapement for successively feeding coins through the chute, means for actuating said escapement operated in timed relation to said indicating means, and means actuated by depression of said treadle for moving said escapement into position to release all coins in the chute.

4. In a parking meter, a support, a casing carried by said support, indicating means in said casing including a pivoted pointer, a train of gearing and a power spring, a treadle, a shank for said treadle journaled in said support and extending laterally therefrom to dispose the treadle in a parking space in position for a vehicle to pass over and depress the treadle to rotate the shank, a crank arm carried by the shank within said support and normally extending upwardly, a draw bar extending vertically in said support and having its lower end pivoted to said crank arm, a connection between the power spring and the draw bar for tensioning the spring when the bar is drawn downwardly by depression of the treadle, a coin chute in said casing, an escapement for individually passing coins through said chute, means actuated by said pointer for actuating said escapement, and means actuated during downward movement of said draw bar for moving the escapement into position to release all coins in the chute.

5. In a parking meter, a support, a casing carried by said support, indicating means in said casing including a pivoted pointer, a train of gearing and a power spring, a treadle, a shank for said treadle journaled in said support and extending laterally therefrom to dispose the treadle in a parking space in position for a vehicle to pass over and depress the treadle to rotate the shank, a crank arm carried by the shank within said support and normally extending upwardly, a draw bar extending vertically in said support and having its lower end pivoted to said crank arm, a vertical rod extending into said casing and having its lower end engaged in a slot formed longitudinally in said draw bar, a connection between the spring and the upper end of said rod for tensioning the spring when the rod and bar are drawn downwardly, a coin chute in said casing, an escapement for individually passing coins through said chute, means actuated by said pointer for actuating said escapement, and means actuated during downward movement of said draw bar for moving the escapement into position to release all coins in the chute.

6. In a parking meter, a hollow standard, a treadle, a shank for said treadle rotatably mounted and extending laterally from said standard to dispose the treadle in a parking space in position for depression by a vehicle passing through the parking space and over the treadle, a crank carried by said shank within the standard, a draw bar extending vertically in said standard and having its lower end connected with the crank, means yieldably resisting downward movement of the draw bar, a casing carried by said standard, a plate mounted in said casing, a train of gearing carried by said plate and including a ratchet shaft and a sprocket wheel carried thereby, a helical spring, a sprocket chain trained about said sprocket wheel and having one end connected with an end of said spring, a vertical rod having its upper end connected with the other end of said chain and its lower end provided with a side arm engaged in a slot formed longitudinaly in said draw bar, a pointer pivotally mounted and having a gear meshing with a gear of the train of gearing, a coin chute in said casing, an escapement for successively feeding coins through said chute, means actuated by said pointer for operating said escapement, and means actuated by downward movement of said draw bar for moving the escapement into position for releasing all coins in the chute.

7. In a parking meter, a hollow standard, a vertical draw bar in said standard yieldably held against downward movement, actuating means for said draw bar extending from said standard, a casing carried by said standard, a mounting member in said casing, a train of gearing carried by said mounting member and including a ratchet shaft, a sprocket wheel carried by said shaft, a helical spring anchored at one end, a sprocket chain trained about said sprocket wheel and having one end connected to the other end of said spring, a vertical pull rod having its upper end connected to the other end of said spring and its lower end engaged in a track extending longitudinally of said draw bar, a dial, a pointer pivotally mounted for movement along said dial and driven from a gear of the train of gearing, a coin chute, a signal tiltably mounted and normally in an upright position between the chute and said mounting member, an escapement for individually feeding coins through said chute, a latch for limiting upward movement of said signal having a trigger engageable by a coin in the chute to hold the latch out of engagement with said signal, means actuated by said pointer for operating said escapement, a lever for swinging said signal to a downward position during downward swinging movement of the pointer across the dial, and means carried by said draw bar for moving said lever into position to shift the escapement out of the chute and release all coins when the draw bar is drawn downwardly through the standard.

8. The structure of claim 7 wherein the pointer is loosely mounted upon a shaft carried by a bar pivoted to the mounting member, a bar being carried by said mounting member for vertical sliding movement and having a portion extending across the pivoted bar and provided with a cam for engaging the pivoted bar as the sliding bar moves downwardly and tilting the same to a position to move the gear of the pointer out of mesh with the companion gear of the train of gearing, an abutment carried by the sliding bar and engageable by the pointer to slide the bar downwardly, and a spring for swinging the pointer to a raised position when the pointer is released from the train of gearing.

9. The structure of claim 7 wherein the pointer is mounted upon a shaft carried by a rocker bar pivoted to the mounting member, a sliding bar carried by the mounting member with a portion crossing the rocker bar and provided with a cam for tilting the bar to a position releasing the pointer from the train of gearing as the bar is slid downwardly, upper and lower abutments carried by the sliding bar, said pointer crossing the slide bar between the abutments for engaging the abutments and shifting the bar vertically, the lower abutment engaging the lever to swing the lever downwardly and shift the signal downwardly during downward movement of the sliding bar by the pointer, and a spring yieldably holding the lever in engagement with the lower abutment of the sliding bar.

10. The structure of claim 7 wherein the pointer is mounted upon a shaft carried by a rocker bar pivoted to the supporting member, a slide bar for actuating said rocker bar to move the pointer out of geared connection with the train of gearing, a spring for swinging the pointer upwardly when released from the train of gearing, upper and lower abutments carried by the sliding bar for engagement by said pointer, a spring yieldably holding the lever in engagement with the lower abutment, the escapement being carried by a rocker shaft having a crank arm overlapped by a portion of the lever, a reciprocating bar carried by the mounting member and having its lower end connected with the crank of the rocker shaft, a finger carried by said pointer for shifting the reciprocating bar upwardly and turn the rocker shaft to actuate the escapement during downward swing of the pointer, and a cam upon said lever for shifting the rocker shaft longitudinally and moving the escapement out of the chute when the lever is lowered by the draw bar.

11. In a parking meter, a casing, indicating means in said casing, operating means for said indicating means including a train of gearing and a spring for driving the gearing, means for tensioning said spring including a treadle disposed in position for passage of a vehicle over the same, means for connecting the treadle with the spring and effecting tensioning of the spring when the treadle is depressed, a signal in said casing movable into and out of a concealed position, means actuated by the spring tensioning means for moving the signal into a visible position, latch means for preventing return of the signal to a concealed position, means for releasably supporting a coin in position to move said latch means into position to permit movement of the signal to a concealed position, and means actuated in timed relation to movement of said indicating means for imparting movement to the coin support to release the coin.

12. In a parking meter, a casing, indicating means in said casing, operating means for said indicating means including a train of gearing and a spring for driving the gearing, means for tensioning said spring including an actuating member disposed in position adapting it to be operated by a vehicle, a rocker shaft associated with said spring tension means, a signal in said casing movable into and out of a hidden position, an arm on the rocker shaft, means actuated by said arm for moving the signal to a visible position, a coin chute, a latch for preventing return movement of the signal to a hidden position, a keeper for supporting a coin in position to move said latch, and means for moving said keeper to effect release of the coin.

13. In a parking meter, a casing, indicating means in said casing, operating means for said indicating means including a power spring, means for tensioning said spring including an actuating member disposed in position for operation by a vehicle, a rocker shaft associated with the spring tension means, a movable signal in said casing, an arm on the rocker shaft, means actuated by said arm for imparting movement to the signal, a coin chute in said casing, a latch for said signal having a trip entering said chute for engagement by a coin to hold the latch out of position for engaging the signal, a keeper for supporting coins in the chute movable to successively feed coins into position to engage the trip of said latch, means for actuating said keeper to successively release coins in the chute, and means actuated from the vehicle-operated member for moving said keeper into position to release all coins in the chute.

14. In a parking meter, a support, a casing carried by said support, indicating means in said casing, operating means for said indicating means including a power spring, a treadle, a shank for said treadle journaled in said support and extending laterally therefrom to dispose the treadle in a parking space in position to be actuated by passage of a vehicle over the treadle, means for tensioning said spring adapted to be actuated by rotation of the shank during depression of the treadle, a movable signal in said casing, means for imparting movement to said signal, a coin chute, a latch for said signal having a trigger entering said chute for engagement by coins, an escapement operating in said chute for individually feeding coins through the chute, means for operating said escapement, and means actuated by depression of the treadle and cooperating with said last-mentioned means for moving said escapement into position to release all coins in the chute.

CECIL T. MITCHELL.